(12) United States Patent
Jonsson

(10) Patent No.: US 10,920,171 B2
(45) Date of Patent: Feb. 16, 2021

(54) REMOVAL OF METAL IONS FROM ESSENTIAL OILS

(71) Applicant: Biotage AB, Uppsala (SE)

(72) Inventor: Stig Jonsson, Lund (SE)

(73) Assignee: Biotage AB, Uppsala (SE)

( * ) Notice: Subject to any disclaimer, the term of this patent is extended or adjusted under 35 U.S.C. 154(b) by 0 days.

(21) Appl. No.: 16/606,861

(22) PCT Filed: Apr. 18, 2018

(86) PCT No.: PCT/EP2018/059881
§ 371 (c)(1),
(2) Date: Oct. 21, 2019

(87) PCT Pub. No.: WO2018/197294
PCT Pub. Date: Nov. 1, 2018

(65) Prior Publication Data
US 2020/0131452 A1   Apr. 30, 2020

(30) Foreign Application Priority Data

Apr. 24, 2017 (EP) .................................... 17167759

(51) Int. Cl.
| | | |
|---|---|---|
| *C11B 9/00* | (2006.01) | |
| *C11B 9/02* | (2006.01) | |
| *A61K 8/00* | (2006.01) | |
| *B01D 15/26* | (2006.01) | |
| *B01D 15/36* | (2006.01) | |
| *B01J 20/24* | (2006.01) | |
| *B01D 15/38* | (2006.01) | |

(52) U.S. Cl.
CPC ............ *C11B 9/022* (2013.01); *B01D 15/265* (2013.01); *B01D 15/362* (2013.01); *B01J 20/24* (2013.01); *B01D 15/3828* (2013.01)

(58) Field of Classification Search
CPC . C11B 9/022; B01J 20/24; A23D 9/02; B01D 15/362; B01D 15/3828; B01D 15/265; A23L 33/105; A23L 2/80; A23L 5/27
USPC ........................................................ 512/5, 1
See application file for complete search history.

(56) References Cited

U.S. PATENT DOCUMENTS

| | | | |
|---|---|---|---|
| 6,132,750 A | 10/2000 | Perrier et al. | |
| 2006/0186050 A1 * | 8/2006 | Hanes, Jr. .............. | B01D 15/00 210/670 |

FOREIGN PATENT DOCUMENTS

| | | | | |
|---|---|---|---|---|
| WO | WO-2007/122720 A1 | 11/2007 | | |
| WO | WO-2010/002696 A1 | 1/2010 | | |
| WO | WO-2010002696 A1 * | 1/2010 | ............. | C11B 9/022 |

OTHER PUBLICATIONS

International Search Report PCT/ISA/210 for International Application No. PCT/EP2018/059881 filed Apr. 18, 2018.
Written Opinion of the International Searching Authority PCT/ISA/237 for International Application No. PCT/EP2018/059881 filed Apr. 18, 2018.
Extended European Search Report for European Application No. 17167759.4 dated Aug. 27, 2017.

* cited by examiner

*Primary Examiner* — Jessica Whiteley
(74) *Attorney, Agent, or Firm* — Harness, Dickey & Pierce, P.L.C.

(57) ABSTRACT

The present invention relates to a method for separating metal ions from a liquid, which method comprises contacting liquid comprising metal ions with non-functionalized cellulose, adsorbing the metal ions to the cellulose, and separating the liquid from the cellulose, wherein the liquid is an essential oil.

12 Claims, No Drawings

REMOVAL OF METAL IONS FROM ESSENTIAL OILS

CROSS-REFERENCE TO RELATED APPLICATIONS

This application is a national phase under 35 U.S.C. § 371 of PCT International Application No. PCT/EP2018/059881 which has an International filing date of Apr. 18, 2018, which claims priority to European patent application number EP 17167759.4 filed Apr. 24, 2017.

TECHNICAL FIELD

The present invention relates to the separation of metal ions from liquids, and more specifically to the separation of small amounts of metals ions.

BACKGROUND

Chromatography is a method commonly used in the biological area to separate desired or undesired components from liquids, such as for the recovery of a desired pharmaceutically active compound from a liquid during biotechnical preparation of a drug, or for the removal of an undesired contaminant.

The principle of chromatography is well-known since decades, and includes utilizing various chemical interactions between the compound to be separated, commonly present in a liquid phase, and a solid phase, often provided in a chromatography column for continuous chromatography or in a vessel for batch chromatography. Such a solid phase is known as a chromatography media or resin, or a packing for the purpose for the most frequently used continuous liquid column chromatography.

In order to interact efficiently with the compound to be separated, sometimes denoted a target, the chromatography packing may either include certain groups as part of the actual packing material, or it may have been provided by chemical modification with groups capable of interacting with the target. The latter is commonly known as chromatography ligands, or simply ligands.

Ligands may interact directly with a target, as exemplified by the ionic interaction between charged targets and oppositely charged ligands in ion exchange chromatography. A specific kind of interaction is provided in metal chelate affinity chromatography (MCAC), also known as immobilized metal affinity chromatography (IMAC), wherein groups present on a solid phase are charged with certain metals to form a metal chelate capable of sufficient interaction with a target to provide an efficient separation suitable for certain contexts. A similar principle is used in argentation chromatography, which may use either silver coated silica in thin layer chromatography (TLC) or silver-loaded cation exchangers suitable for column chromatography. An example of a commercially available such product is Rensa™ resins which are marketed e.g. for the separation of pesticides from food (www.biotage.com).

Silver-loaded cation exchangers are commonly used for purifying and separating unsaturated small molecules, e.g. fatty acids, pheromones and polyaromatic sulphur-containing heterocycles, for analytical as well as for preparative purposes in the food area and other areas. A problem that may occur with any metal-loaded chromatography material is a certain leakage of metal ions into the eluate i.e. into the product stream. As in the food industry, it is generally a requirement that food raw materials, components or products are not contaminated by metals during processing, removal of leaked metal ions may be introduced as a step subsequent to the IMAC, MCAC or argentation chromatography.

Various such metal scavengers have been proposed, and there are a number of products commercially available. Silicycle provides an example of metal scavengers for screening purposes.

Further examples of scavenging materials based on functionalized silica or resins for use as the last step in a chromatography area are QuadraPure® TU macroporous, resin beads obtainable from Sigma Aldrich.

U.S. Pat. No. 6,132,750 (Eric Perrier) relates to small sized particles, which comprise at least on the surface thereof a wall composed of a mixture of at least one protein and at least one polysaccharide which are cross-linked, preferably by interfacial cross-linking with a polyfunctional acylating agent which forms at least amide and ester bonds, and optionally anhydride bonds with amine, hydroxyl or carboxyl functions of the protein and of the polysaccharide, and which comprise hydroxamic groups on the surface thereof for chelating metal ions. These particles can be used in cosmetics or in pharmacy notably for the chelation or release of metal ions.

WO 2007/122720 (Niisawa Kazuhiro) describes a method which comprises the steps of (1) treating a metal-containing raw material with hydrochloric acid to obtain a hydrochloric acid solution of ions of the metal; (2) treating the hydrochloric acid solution obtained in the step (1) with cellulose dispersed in an adsorption auxiliary agent consisting of at least one organic solvent to cause the cellulose to adsorb the metal ions contained; and (3) conducting desorption and recovery of the metal ions from the cellulose with the use of water or hydrochloric acid.

However, as the metal scavengers proposed and presented in the prior art have been suggested for the processing of liquids such as fermentation liquids in biotechnological processing and for other purposes where the metal contaminated liquid is an aqueous liquid, there is a need in this field for novel products which can efficiently remove even small quantities of metal ions, such as silver ions, from non-aqueous liquids.

WO 2010/002696 (Coca cola Co) describes a method for treating an essential oil composition including the steps of contacting an essential oil composition with an adsorbent material and separating the adsorbent material from the treated essential oil. The proposed adsorbent materials include activated carbon, amorphous silicas, bleaching earth, fuller's earth, and diatomaceous earth.

However, there is still a need in the field of improves methods capable of removing even small quantities of metals from non-aqueous liquids.

SUMMARY OF THE INVENTION

The present invention provides novel methods for removing even extremely small quantities of metal ions from organic liquids. According to the invention, it was unexpectedly found that non-functionalized cellulose, which is a highly hydrophilic material commonly used in chromatography for the processing of aqueous liquids, could be used to efficiently separate metal ions from organic liquids, such as essential oils.

This may be achieved by a method for separating metal ions from a liquid, which method comprises contacting liquid comprising metal ions with non-functionalized cellulose, adsorbing metal ions to the cellulose, and separating the liquid from the cellulose, wherein the liquid comprises essential oil.

Further embodiments, advantages and other details of the present invention will appear from the experimental part below as well as from the application as a whole.

Definitions

The term "scavenger" or "scavenge" is used herein in the context of detecting and/or removal of very small quantities of a molecule or a compound.

The term "cellulose" is used herein for a polysaccharide defined by the chemical formula $(C_6H_5O_5)_n$.

The term "heterocellulose" is used herein for any heteropolymer of cellulose which includes a polysaccharide defined by the chemical formula $(C_6H_5O_5)_n$ which has not been chemically modified.

The term "non-functionalized cellulose" is used herein for cellulose which has not been chemically or otherwise modified by derivatisation at its OH groups.

The term "oil" is used herein for any neutral, nonpolar chemical substance that is a viscous liquid at ambient temperatures and is both hydrophobic and lipophilic.

The term "essential oil" is used herein for a concentrated hydrophobic liquid containing volatile aroma compounds from plants.

DETAILED DESCRIPTION OF THE INVENTION

In a first aspect, the present invention relates to a method for separating metal ions from a liquid, which method comprises contacting liquid comprising metal ions with non-functionalized cellulose, adsorbing metal ions to the cellulose, and separating the liquid from the cellulose, wherein the liquid comprises essential oil.

The non-functionalized cellulose used according to the present invention may be obtained as a pulp from fibrous plant material, such as wood or cotton, in accordance to well-known methods. The non-functionalized cellulose used herein may include microcrystalline cellulose and/or alpha-cellulose, which are cellulose derived from high quality wood pulp both of which are available from commercial sources such as Sigma Aldrich or food additive producers.

Alternatively, a mixture of cellulose and other heteropolymers thereof is used in the present method, provided the mechanical and other properties of such mixture are similar enough to the pure non-functionalized cellulose to remove metals from essential oils as described herein.

The present method may be a method of chromatography, wherein the non-functionalized cellulose is used as, or included in, the solid phase. Thus, if the chromatography is operated as continuous liquid chromatography, the column comprises non-functionalized cellulose as a packed column or fluidized bed. Alternatively, if the method is a chromatography method operated in batch mode, the vessel or container used comprises non-functionalized cellulose as the solid phase.

Alternatively, the present method may be a method of filtration, wherein non-functionalized cellulose constitutes all or part of a filter. As is well known, the efficiency of the scavenger filter is directly related to the density and average particle size of the cellulose fibres. Use of the coarser grades, i.e. longer fibres, lower density powders, in filtration will result in a lower degree of adsorption efficiency. Use of the finer grades, shorter fibres, more dense powders will result in faster adsorption and more ions captured from the eluent at higher column flows.

As the skilled person will appreciate, the non-functionalized cellulose according to the invention may be provided in any format suitable for a certain application, provided the appropriate conditions for enabling the adsorption of metal ions in the herein described quantities. Illustrative conditions will be exemplified in the Experimental part below.

The essential oil from which metal ions are to be separated may be any essential oil, such as citrus oil or scented oil, or more specifically *eucalyptus* oil, lavender oil, peppermint oil, spearmint oil, cedar wood oil, rose oil, oil of clove etc. As is well known, essential oils are volatile, generally concentrated, essences of plants, and may be found in a variety of plant parts, including but not limited to roots (as in vetiver); leaves (as in spearmint leaves); flowers (as in rose); citrus fruits (as in bergamot) and seeds (as in cumin). Citrus oils, including oils from citrus, sweet orange, lemon, bergamot, mandarin, lime, tangerine and grapefruit, or any combination thereof, are examples of essential oils.

As the skilled person will appreciate, small amounts of diluent may be included in such an essential oil. A diluent which can be used according to the invention may be selected from the following groups: hydrocarbons, ketones, ethers, esters, more suitable are the hydrocarbons cyclohexane, heptane limonene.

The present invention encompasses the separation of metal ions from essential oil(s) which may be intended for the food or pharmaceutical industry. Thus, the essential oil to be purified according to the invention may have been contaminated with metal ions resulting from earlier steps in a process, such as a preceding step of chromatography; or with metal ions which originate from one of the components of the oil, such as pesticides that have contacted the fruit used to make citrus oil.

As discussed above, metal-loaded cation exchangers are widely used in the food industry, but also in other areas such as the pharmaceutical industry. In most such uses, there is a risk of leakage of metal ions from the solid phase, and if the end product is intended for human applications the removal thereof becomes important.

Thus, the method according to the invention may include an essential oil which originates from a preceding chromatography step using a different chromatography principle, such as a metal-loaded cation exchanger or argentation chromatography. Hence, the present method may use non-functionalized cellulose as a scavenger in one of the later steps of a multi-step process for separation of a target from an essential oil. The column packing used in the step preceding the method according to the invention may comprises synthetic polymers charged with metal ions. One example of preparing such a column packing will be presented as Example 1 below. Alternatively, the column packing used in the step preceding the present method may be a commercially available product which is known to provide a certain metal leakage under certain circumstances, such Purolite® $C^{100}EAG$. As the skilled person will appreciate, the specific details of such a preceding step are not crucial for the subsequent use of the invention, as long as an essential oil is used as an eluent and that such eluent comprises a certain level, or leakage, of metal ions to be removed.

The metal ion separated from the liquid in the method according to the invention may be a positively charged monovalent or multivalent metal ion, such as a transition metal ion. Thus, the metal ion may be selected from the group consisting of Au$^+$ or Au$^{2+}$; Ag$^+$, Cu$^+$, Pt$^{2+}$, Pd$^{2+}$, Ni$^+$ and Co$^+$. In an advantageous embodiment, the metal ion is silver i.e. Ag$^+$.

As the skilled person will appreciate from the present specification, the essential oil should be maintained under conditions where all or essentially all of the metal(s) to be removed are present in ionic form. Thus, for example reducing conditions should be avoided.

Without wishing to be bound by any theory, as the fibres of non-functionalized cellulose have a porous structure, the surfaces thereof may allow for penetration of metal ions. The positive technical effect of the present invention may be due to salt formation between the cellulose and the metal ion, but it may alternatively also include metal clusters and/or colloidal metal.

As an illustration of the effect of the invention, Example 2 shows a typical eluent profile of the concentration of migrating silver ions into orange oil. Fractions of the eluent have been measured at different volumes and found to be in the range of 0.6 to 2 ppm. If the oil is of a complex constitution, the scavenging performance of the non-functionalized cellulose may be affected. In one embodiment of the present invention, undesirable oil effects are minimized by dilution of the oil matrix with organic solvents or limonene. For example, citrus/lemon oil diluted with cyclohexane and/or limonene improves the efficiency of the non-functionalized cellulose as a scavenger of silver ions, as compared to non-diluted citrus/lemon oil. This enables an improved separation of silver ions by the non-functionalized cellulose used according to the invention.

The chemical compositions are different between different oils. For example, the main chemical components of spearmint oil are α-pinene, β-pinene, carvone, 1,8-cineole, linalool, limonene, myrcene, caryophyllene and menthol. In orange oil: α-pinene, sabinene, myrcene, limonene, linalool, citronellal, neral and geranial. In lemon oil: α-pinene, camphene, β-pinene, sabinene, myrcene, α-terpinene, linalool, β-bisabolene, limonene, trans-α-bergamotene, nerol and neral. Rose oil is one of the most complex main chemical components are citronellol, phenyl ethanol, geraniol, nerol, farnesol and stearpoten.

As discussed above, the removal of metal ions may be extremely important even if only very small quantities are present in an essential oil. Thus, the present method may result in a metal content of the essential oil after purification below 0.05 ppm, such as silver in orange oil.

As a comparison, EPA has established National Secondary Drinking Water Regulations, established as guidelines to assist public water systems in managing their drinking water for aesthetic considerations, such as taste, colour, and door. Silver is included in this list as a contaminant. According to this list, Ag$^+$ is not considered to present a risk to human health in drinking water below 0.10 mg/L (0.10 ppm).

In example 3, the ratio between resin amount and scavenger amount was evaluated. Migration levels of silver and scavenging effect of the cellulose was measured. The results suggest a scavenger capacity of app 0.5-0.7 mg silver per gram non-functionalized cellulose according to the invention, in order to remove silver ions to <0.05 ppm in pooled collected oil (orange oil).

In comparative example 4, a commercially available resin for silver scavenging was compared with the method according to the invention under same scavenging conditions. 125 mg of the resin, with a reported capacity of 3-3.5 mmole/g (thiourea functionality) was used. 630 g orange oil was processed. Analysis of the oil showed before scavenger 1.13 ppm, after scavenger final eluent 0.315 ppm and on pooled eluent 0.248 ppm. The results suggest that in spite of high capacity, the resin has low efficiency to scavenge silver to the lower concentration range in oil.

The function of the metal loaded resin is to interact and immobilize impurities in the oil, such as certain classes of pesticides. In example 5, the oil has been spiked with 40 ppm malathion, an organo-thiophosphate pesticide. The results show that silver migrates to various extent, from 0.3 to 0.7 ppm, depending on oil. The cellulose material removed the silver level to below 0.1 ppm silver.

Corresponding experiment with orange oil was conducted in batch mode. The orange oil was spiked with the pesticides malathion and chlorpyrifos. The purification (removal of pesticides) was achieved by suspension of the silver resin beads in the oil. It was found that encasing the resin in a "teabag" of high quality paper or cotton substantially lowered the migrating silver while maintaining the performance.

In a second aspect, the present invention relates to a system for liquid chromatography, which system comprises at least a and a second chromatography column, wherein a first column packing comprises synthetic polymers loaded with metal ions and a second column packing comprises non-functionalized cellulose. The second column may be as discussed above in the context of the first aspect of the invention.

The parameters of the system, such as the distance between the non-functionalized cellulose column and its preceding step, the available surface area of the non-functionalized cellulose, the flow rate etc., should be adjusted to ensure that the metal ions present in an essential oil purified in such a system will remain in ionic form.

The invention also relates to a system for liquid chromatography, which system comprises equipment for at least a first and a second chromatography step, wherein for the first step, equipment for either IMAC or argentation chromatography is provided; and for the second step, a column is provided which comprises non-functionalized cellulose. An example may be a chromatography column for argentation chromatography, to which a scavenger column comprising non-functionalized cellulose has been connected downstreams. The scavenger column may be arranged as a post-column; or as a lower part of the argentation chromatography column. Alternatively, a chromatography column for silver-loaded cation exchange or IMAC is connected to a scavenger column comprising non-functionalized cellulose, which in accordance with the present invention removes at least part of the content of metal leakage, preferably silver ion (Ag$^+$) leakage from the preceding step.

Further, the invention relates to the use of non-functionalized cellulose to prepare a chromatography packing for metal ion scavenging.

Finally, the invention relates to a scavenger chromatography column, which comprises a packing which is, or includes, non-functionalized cellulose. As appears from the above, such a scavenger column is advantageously used in the removal of metal ions from essential oils. Thus, all details provided above with regard to the method for separating metal ions from essential oils will apply to this and the other aspects of the invention as well.

EXPERIMENTAL

The present examples are provided for illustrative purposes only, and should not be construed as limiting the invention as defined by the appended claims. All references provided below and elsewhere in the application are hereby included herein via reference.

Example 1: Preparation of Silver-Loaded Cation Exchanger

Water (100 mL) and tributylamine (7.4 g, 0.04 mole) followed by sulfuric acid (2.0 g, 0.02 mole) and then 4-vinylbenzenesulfonic acid sodium salt (8.4 g, 0.04 mole) were added to a bottle under stirring. Toluene (55 mL) was added and the 2-phase system stirred vigorously for 0.5 h, pH=2.5. The phases were easily separated and the toluene phase used without purification in the next step.

Polyvinylalcohol (PVA) (Celvol 523) was dissolved in water (400 mL) at 90° C. to form a 2% solution by weight, cooled to room temperature and then added to a suspension reactor.

Divinylbenzene 80% technical grade (26 g, 0.2 mole) was added to the prepared toluene solution of 4-vinylbenzene-sulfonic acid tributylamine salt (described above). Initiator, ABDV (V65, 2,2'-azobis(2,4-dimethylvaleronitrile) (0.6 g) was added to the toluene solution and nitrogen was bubbled through the solution. The PVA solution was charged to the reactor followed by the monomer solution.

The two-phase mixture was stirred for some minutes and the temperature was elevated to 50° C. and after 4-6 h raised to 65° C. The process was maintained overnight. The polymer was filtered using 20 micron sieves and carefully washed with water. The polymer was washed with 1 M $H_2SO_4$ for 0.5 h, and thereafter washed with about 400 ml of water. The polymer was then washed in soxhlet with ethanol overnight, and dried to give 28.4 g polymer (83% yield). Particle size was determined to be 100-300 micron.

Silver loading of the porous polymeric separation material was performed as follows: 16.1 g of the dry polymer was swelled in water and transferred to a glass column. After settlement of the material, aqueous $AgNO_3$ (0.5M, 44 mL) was slowly passed the column. The column was allowed to stand overnight and then washed with 300 mL deionized water and finally dried under vacuum at 40° C. The material had a white-beige colour, and elemental analysis of the material showed 2.64% S and 6.49% Ag.

Example 2: Use of Silver-Loaded Cation Exchanger for Purifying Essential Oils 500 mg silver loaded separation material was packed in a column (ID=7 mm) and allowed to swell for 3 h in orange oil (natural, cold-compressed, California origin, obtained from Sigma-Aldrich). The column was protected from light with aluminium foil. The oil was used undiluted from bottle and not spiked with pesticides. The column chromatography was run at room temperature. A constant flow of orange oil was pumped through the column at ca 0.15 mL/min during 13 days, altogether 2.3 L oil (1.95 kg).

Samples (1 mL) were collected from the eluent at different volumes. The oil was digested in nitric acid and the migrated silver level determined with the ICP-MS technique.

| Amount processed oil | Silver concentration (mg/kg) |
|---|---|
| 340 g | 1.97 ppm |
| 590 g | 1.52 ppm |
| 1075 g | 1.23 ppm |
| 1180 g | 0.93 ppm |
| 1350 g | 0.93 ppm |
| 1950 g | 0.62 ppm |

Example 3: Use of Non-Functionalized Cellulose for Removing Silver in Orange Oil The experimental set-up and parameters from example 2 was used. After the silver loaded separation column, a post column (ID=22 mm) with scavenger was attached. Both the resin column and scavenger column were protected from light with aluminium foil. Three series of experiments were performed to study silver migration and scavenging effect of the studied cellulose. The experiments were varied with regard to amount silver resin and amount cellulose.

The cellulose used was microcrystalline cellulose (powder 20 μm, pH 5-7 Sigma-Aldrich). Samples (1 mL) were collected from the eluent oil from the silver resin column and eluent after scavenger at indicated volumes.

| Experiment | Resin amount (mg) | Amount non-functionalized cellulose (mg) | Amount essential oil g | Silver concentration (before/after) |
|---|---|---|---|---|
| 1 | 185 | 2500 | 185 | 0.48/0.088 ppm |
| 2 | 185 | 2500 | 800 | 0.10/0.010 ppm |
| 3 | 500 | 1250 | 170 | 1.40/0.032 ppm |
| 4 | 500 | 1250 | 750 | 0.93/0.037 ppm |
| 5 | 1500 | 600 | 170 | 2.00/0.062 ppm |
| 6 | 1500 | 600 | 340 | 1.92/0.22 ppm |
| 7 | 1500 | 600 | 590 | 1.30/0.83 ppm |

Example 4: Use of Commercial Resin for Removing Silver in Orange Oil (Comparative Example)

The experimental set-up and parameters from example 2 was used. After the silver loaded separation column (500 mg) was a post column attached with 125 mg Aldrich QuadraPure TU macroporous (particle size 400-600 μm, thiourea capacity 3.0-3.5 mmole/g resin).

630 g oil was processed. Analysis of the oil showed before scavenger 1.13 ppm, after scavenger final eluent 0.315 ppm and on pooled eluent 0.248 ppm silver.

| Experiment | Resin amount (mg) | Amount scavenger (mg) | Amount essential oil (g) | Silver concentration (before/after) |
|---|---|---|---|---|
| | 500 | 125 | 630 g | 1.13/0.315 ppm |

Example 5: Use of Non-Functionalized Cellulose for Removing Silver from Various Essential Oils A syringe pump was filled with 25 mL spiked oil and the oil was slowly during 24 h passed through a plastic column with 100 mg silver loaded resin. After the silver loaded separation column was a post column attached (300 mg microcrystalline cellulose). The oils were each spiked with 1 ml limonene containing 1 mg malathion (40 ppm). The concentration of pesticide was measured before and after passing the silver loaded separation column with GC-MS technique.

| Oil | Silver concentration before scavenging (ppm) | Silver concentration after scavenging (ppm) | Removed pesticide in percent |
|---|---|---|---|
| Orange oil | 0.327 | 0.066 | 94 |
| Grapefruit oil | 0.724 | 0.036 | 12 |
| Spearmint oil | 0.393 | 0.032 | 58 |

Example 6: Use of Batch Technique for Purification of Pesticide-Spiked Orange Oil Orange oil was spiked with 20 ppm malathion and 20 ppm chlorpyrifos. 25 g oil was shaken for 24 h with 100 mg silver loaded resin in plastic tubes.

| | |
|---|---|
| A | no scavenger |
| B | resin filled in a "tea bag" made from 0.21 g cotton woven fabric |
| C | resin filled in an envelope made from 0.22 g cellulose filter paper Munktell 120 H. |

Samples were collected from the oil after 24 h and silver/pesticide concentration determined.

| Exp | Silver conc in oil (ppm) | Removed malathion in percent | Removed chlorpyriphos in percent |
|---|---|---|---|
| A | 0.752 | 62 | 40 |
| B | 0.137 | 76 | 54 |
| C | 0.063 | 39 | 40 |

The invention claimed is:

1. A method for separating metal ions from a liquid, the method comprising:
   contacting the liquid comprising the metal ions with non-functionalized cellulose;
   adsorbing metal ions to the cellulose; and
   separating the liquid from the cellulose,
   wherein the liquid comprises an essential oil.

2. A method according to claim 1,
   wherein the method is a chromatography method, and
   wherein the non-functionalized cellulose is used as, or included in, a solid phase.

3. A method according to claim 1, wherein the non-functionalized cellulose comprises at least a part of a filter.

4. A method according to claim 1, wherein the essential oil includes at least one of a citric oil and a scented oil.

5. A method according to claim 1, further comprising a preceding immobilized metal affinity chromatography ("IMAC") or argentation chromatography operation performed on the liquid.

6. A method according to claim 5, wherein the preceding chromatography operation utilizes synthetic polymers charged with metal ions.

7. A method according to claim 1, wherein the metal ions include Ag+.

8. A method according to claim 1, wherein the essential oil includes a citric oil.

9. A method according to claim 8, wherein the citric oil includes at least one of lemon oil, orange oil, or grape fruit oil.

10. A method according to claim 1, wherein the essential oil includes a scented oil.

11. A method according to claim 10, wherein the scented oil is at least one of *eucalyptus* oil, lavender oil, peppermint oil, spearmint oil, cedar wood oil, rose oil, and oil of cloves.

12. A method according to claim 3, wherein the non-functionalized cellulose comprises all of the filter.

* * * * *